United States Patent [19]

Griffin et al.

[11] Patent Number: 4,750,513

[45] Date of Patent: Jun. 14, 1988

[54] PIVOTALLY MOUNTED FUEL COLLECTOR

[75] Inventors: Ranald L. Griffin, Huntsville; Alfred H. Glover, Decatur; William D. McKee, Huntsville, all of Ala.

[73] Assignee: Chrysler Motors Corporation, Highland Park, Mich.

[21] Appl. No.: 122,866

[22] Filed: Nov. 19, 1987

[51] Int. Cl.[4] .................... F16K 43/00; F04B 17/00
[52] U.S. Cl. ..................................... 137/316; 417/360
[58] Field of Search ............... 137/315, 316, 574, 576, 137/590, 592, 615, 855, 895, 15; 123/509, 514; 92/128; 417/360

[56] References Cited

U.S. PATENT DOCUMENTS

| | | | |
|---|---|---|---|
| 2,785,546 | 3/1957 | Bauerlein | 137/895 |
| 3,049,171 | 8/1962 | Neuerburg et al. | 137/590 |
| 3,354,905 | 11/1967 | Lewis et al. | 137/590 |
| 4,304,530 | 12/1981 | Gens | 137/565 |
| 4,340,023 | 7/1982 | Creager | 137/590 |
| 4,397,333 | 8/1983 | Liba et al. | 137/574 |
| 4,590,964 | 5/1987 | Beardmore | 137/590 |
| 4,706,707 | 11/1987 | Betterton et al. | 137/592 |

Primary Examiner—A. Michael Chambers
Attorney, Agent, or Firm—Kenneth H. MacLean, Jr.

[57] ABSTRACT

A vehicle fuel handling apparatus in a fuel tank including a fuel pump supported by a fuel delivery conduit, a fuel return conduit and an elongated fuel collector. The collector is pivotally supported by the pump and the fuel return conduit for movement from an installation position in which the collector is closely spaced with respect to the conduits for the purpose of easy insertion through a small opening in the fuel tank to an installed position in which the collector is moved away from the conduits and into overlying contact with respect to the bottom of the fuel tank.

4 Claims, 4 Drawing Sheets

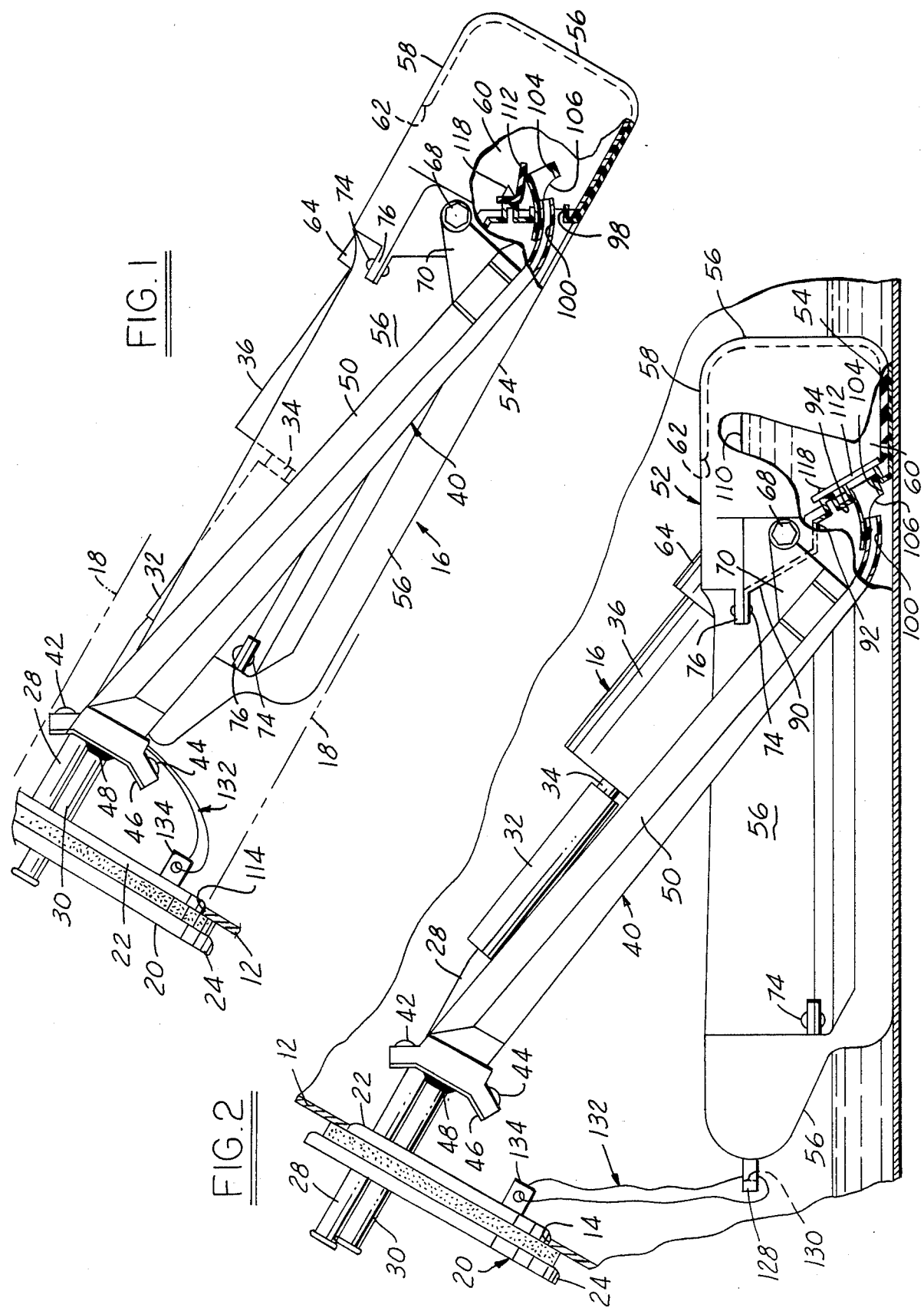

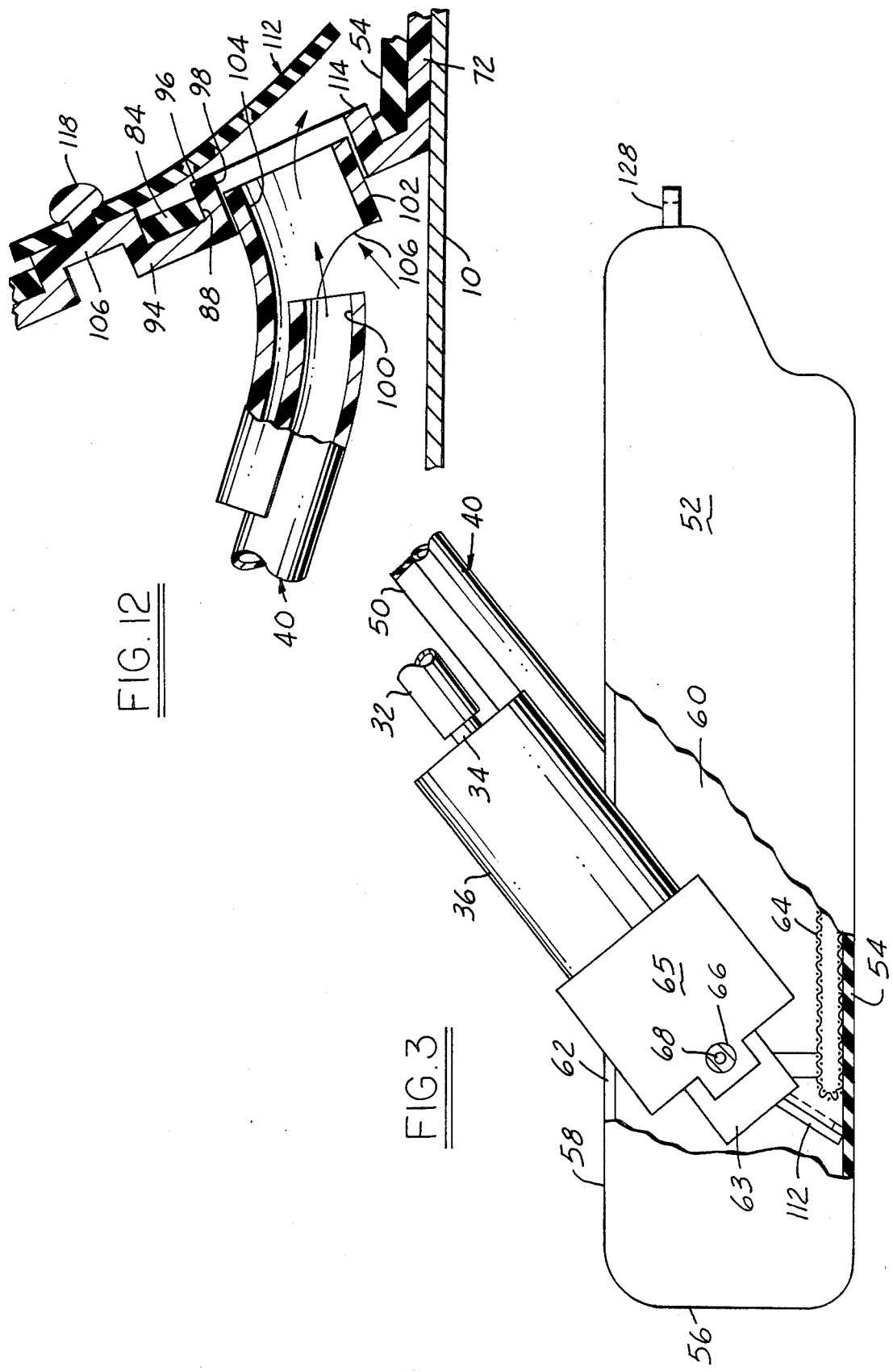

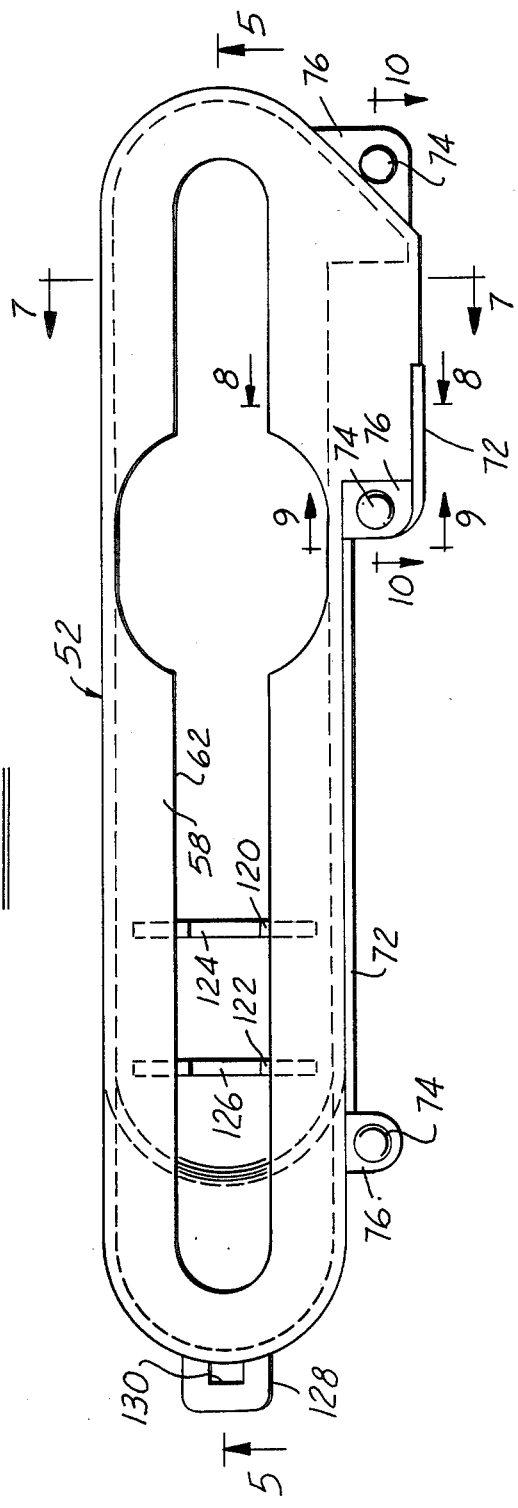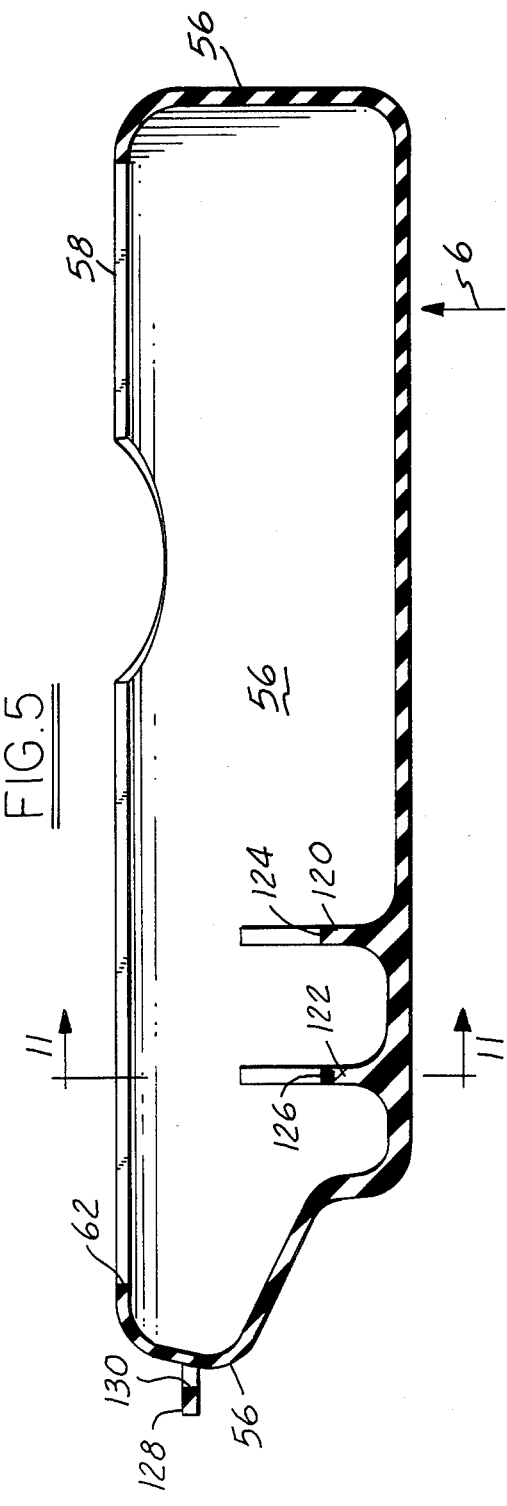

PIVOTALLY MOUNTED FUEL COLLECTOR

BACKGROUND OF THE INVENTION

Modern automobiles usually use an electric fuel pump within the fuel tank to pass fuel to the engine fuel injection system. Excess fuel which is not necessary for engine operation is then returned to the fuel tank through a separate fuel return line or conduit. A reservoir like device to collect fuel about the inlet of the fuel pump is desirable, particularly when the fuel level in the tank is low. The collector prevents starvation of the pump which could cause the engine to die which could subsequently result in abnormally prolonged cranking of the engine starter motor during a restart operation.

Basically, the collector is an open topped container supported at the bottom of the fuel tank and surrounds the inlet of the fuel pump. The fuel return line empties into the collector in a manner that draws additional fuel from the surrounding fuel tank into the collector. An aspirator type device is normally used to draw additional fuel into the collector. By this means, the fuel level in the collector may be raised significantly above the level of fuel in a nearly empty fuel tank. Early fuel collectors or reservoirs were attached to the bottom wall of the fuel tank. This is a relatively costly arrangement and once the tank is assembled or completed, the reservoir may not be withdrawn or serviced. Examples of U.S. patents exhibiting this type of collector structure are: 3,049,171 to Neuerburg and 4,397,333 to Liba et al.

Rather than attachment of a collector or reservoir to the fuel tank, it would be better to mount the collector to the fuel delivery means extending into the fuel tank. A problem with this is the limitation in collector size which may fit through the access opening of the tank. Also, there must be some way to insure that the collector engages the tank bottom so that substantially all the fuel is removed from the tank. Another reason that the collector must engage the tank bottom is to eliminate movements and vibrations in the tank.

SUMMARY OF THE INVENTION

This application's fuel delivery apparatus includes a collector which is mounted on the aforesaid fuel delivery means which includes the fuel pump and fuel outlet and return conduits. In addition, the collector is supported in a manner which allows the collector to pivot against the fuel conduits so that the apparatus assumes a relatively small profile or cross section. This small profile allows the collector to easily be inserted through an access opening into the fuel tank. Once in the tank, the collector may pivot away from the conduits and engage the tank's bottom wall in a desirable close overlying relationship.

The subject collector is unlike the collectors previously identified in the patents. Those collectors were made of rigid material such as steel or the like. The subject collector is of rubber or a rubber like material which is relatively flexible. The flexibility permits the collector to conform to fuel tank bottom which may have irregularities from tank to tank. Also, the flexible collector readily accommodates other irregularities or differences in the distance from the tank bottom and the insertion opening. The rubber material is also capable of damping vibrations and resists damages by the adjacent tank bottom because of its toughness.

As previously stated, the collector is mounted so as to pivot about the fuel delivery apparatus, particularly the inlet of the fuel pump. For the purpose of introducing desired quantities of fuel and thus produce a sufficient liquid level in the collector, the subject apparatus has a return conduit for excess fuel discharging into the collector. The fuel return conduit helps support the collector and discharges a stream of fuel into the collector in the manner of an aspirator. Specifically, the outlet end portion of the fuel return is directed into an aperture in the collector. The aperture is located above the bottom wall of the collector and is configured so that the end portion of the fuel return axially moves therein when the collector is pivoted between the first installation position and the second installed position described heretofore.

The end portion of the fuel return is configured with a hood-like means thereabout which defines a gap or opening adjacent the aforesaid fuel return flow or stream. This gap communicates with the fuel tank interior so that the stream of return fuel into the aperture and collector draws additional fuel into the collector from the fuel tank. Consequently, the liquid fuel level in the collector may be built-up higher than the level in a nearly empty fuel tank.

From the foregoing comments and description of the subject apparatus, it can be understood that the fuel delivery means and the associated improved collector is a very useful and practical device with several important features. Further advantageous features and objects can be appreciated by a reading of the following detailed description of a preferred embodiment of the fuel delivery apparatus and collector as shown in the drawings which are described as follows:

IN THE DRAWINGS

FIGS. 1 and 2 are side elevational views of the apparatus first in an installation operative position and second in an installed position relative to a fuel tank and broken away to reveal otherwise hidden features; and FIG. 3 is a view like FIG. 2 but taken from an opposite side of the collector and broken away to reveal interior features; and FIG. 4 is a planar top view of the collector device; and FIG. 5 is a sectioned view taken along section line 5—5 in FIG. 4 and looking in the direction of the arrows; and FIG. 6 is a bottom view of the collector looking in the direction of arrow 6 in FIG. 5; and FIGS. 7–11 are sectioned views of the collector taken along respective section lines 7—7 to 11—11 in FIGS. 4 and 5 and looking in the direction of the arrows; and FIG. 12 is an enlarged fragmentary view of the fuel return and aspirator portion of the device in the installed operative position.

DETAILED DESCRIPTION OF AN EMBODIMENT

Figure 6:
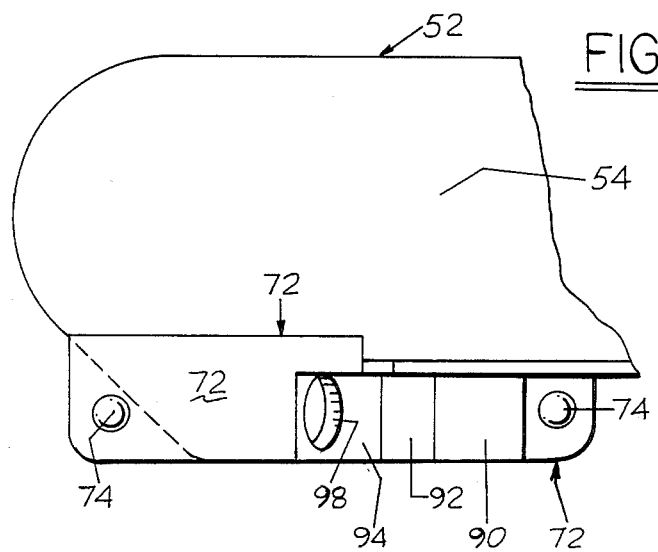

Particularly in FIGS. 1-3, a fuel delivery apparatus is illustrated for a fuel tank. The fuel tank is not shown in its entirety but a bottom wall 10 and an inclined side wall 12 thereof are shown, it being understood that the tank typically is a sheet metal enclosure with top, bottom and side wall portions. The tank may take many forms and configurations, all applicable to the subject apparatus.

In the drawings, the side wall 12 of the tank is inclined with respect to the bottom wall 10. An aperture or opening 14 is formed in the side wall 12 for the purpose of insertive inclusion or assembly of a fuel delivery and collector apparatus 16 as best illustrated in FIG. 1. Specifically, the apparatus is in an installation operative position as opposed to the installed operative position shown in FIGS. 2 and 3. In the installation position, the apparatus has a narrow or relatively small profile or cross-sectional shape to enable the apparatus to fit through the opening 14 as extended by the broken lines 18 which define a cylindrical form or boundary corresponding to the configuration of opening 14.

Referring to FIGS. 1 and 2, the apparatus 16 is supported relative to the side wall 12 by a cover member 20 with a radially inward edge portion 22 adapted to fit within the opening 14 and a radially outward edge portion 24 overlying the side wall of the outside of the fuel tank. An annularly shaped seal member 26 extends between the edge portion 24 and the side wall 12. The cover member 20 supports a fuel delivery or pump outlet fitting 28 and a fuel return fitting 30, both of which are of metal tubing extending through the cover. The exterior end portions of the fittings 28, 30 are adapted to be attached to fuel lines extending to the associated vehicle's engine.

The interior end of the fitting 28 is connected to a conduit or hose 32, the lower end of which is connected to an outlet 34 of an electric fuel pump 36. Likewise, the interior end of the other fitting 30 is connected to the upper end portion 38 of a fuel return conduit 40 by fasteners 42, 44. Specifically, the fasteners 42, 44 extend through a laterally extending portion of conduit 40 and thread into a similarly extending fitting 46 attached to the interior end of fitting 30 by a weld or the like 48.

The fuel return conduit 40 is a rigid tubular member for passing unneeded fuel from the vehicle engine fuel injection system back into the fuel tank. In the preferred embodiment illustrated in the drawings, the conduit 40 is a molded plastic member which includes a thin web or rib 50 which extends axially of the tubular portion of the conduit 40. The rib 50 serves to strengthen the conduit 40 which is a primary support of the collector portion of the apparatus 16 as will be more apparent hereinafter.

Referring to FIGS. 2 and 3, the apparatus 16 includes an elongated liquid fuel collector 52. In the installed position, the bottom wall 54 of the collector 52 extends along and over the tank's bottom wall 10. The collector also has a continuous side wall 56 and a top wall 58. The walls 54, 56, 58 generally encircle and interior 60 of the collector. The top wall 58 defines an elongated opening 62 to the interior 60 through which the fuel pump 36 extends. Opening 62 also allows fuel to readily fill the interior 60 without trapping vapor.

As perhaps best shown in FIG. 3, the fuel pump 36 extends from the conduit 32 downward into the collector interior 60 through opening 62. The pump 36 has the outlet fitting 34 at an upper end and an inlet forming member 63 at a lower end. The inlet includes a screen-like filter member 64 which is flexible to allow pivotal movement of the collector about the pump. The pump 36 is generally cylindrically shaped and is supported at its lower end by a tubular mounting member 65. The member 65 includes a tubular projection 66 extending outward from the side of the member 65. Although not shown in FIG. 3, a similar projection extends from the other side of the mount 65 but in an opposite direction. The projections are aligned one with the other and engage the inner side wall of the collector 52. A pair of fastener 68 of the self tapping type extend through openings in the side wall 56 of the collector 52 and thread into the tubular projections 66 thus pivotally connecting the collector and the fuel pump mount 65 together.

In the previous paragraph it was explained how the collector 52 and fuel pump mount 65 were pivotally connected. As seen in FIGS. 1 and 2, the collector 52 and the return conduit 40 are also pivotally connected by one of the pair of fasteners 68. Specifically, an offset arm 70 on the lower end portion of return conduit 40 has a bore therein for passage of fastener 68. Thus, the collector pivots between the installation and the installed operative positions of FIGS. 1 and 2 about the common axis of the fasteners 68.

In FIGS. 4-11, details of the collector structure are illustrated. The previously discussed details of the collector are not repeated hereafter. The collector 52 is an elongated and generally hollow enclosure which is molded of flexible rubber or rubber-like material. The rubber structure adapts well to the bottom of the fuel tank and dampens vibration. The enclosure shape of the collector imparts sufficient strength when in the installed position of FIG. 2. During installation of the collector, greater longitudinal strength is needed than the rubber structure offers. To strengthen the structure, a spine or stiffener is attached to the rubber collector body as discussed hereinafter.

In FIGS. 4 and 6-11, the collector is strengthened by an elongated spine or stiffener member 72. The stiffener 72 is molded of tough and relatively rigid elastomeric material and is attached to the flexible collector structure by the three fasteners or rivets 74. Specifically, the rivets 74 extend through aligned holes in the stiffener 72 and an equal number of outward tab portions 76 of the collector. Thus, the stiffener 72 significantly strengthens the collector in the axial or length direction thereof. Before the collector 52 is in the assembled or installed position of FIG. 2, the collector needs longitudinal strength.

Figure 10:
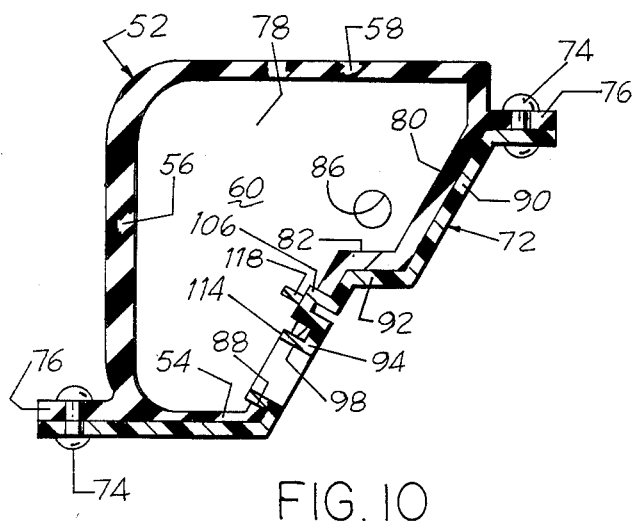
Figure 11:
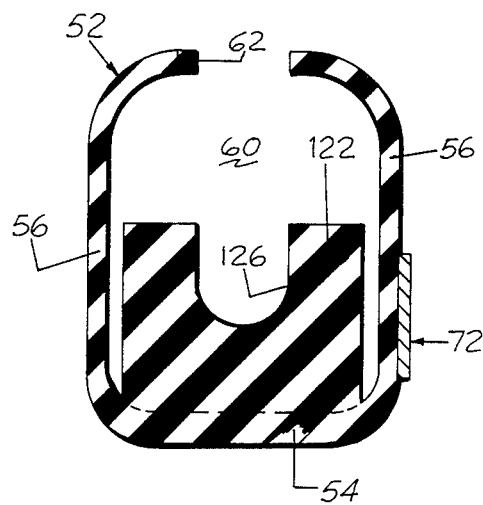

The stiffener 72 lies in side by side relation with the collector body and also defines a firm portion of the collector through which a fuel inlet and return aperture extends. Specifically, the collector 52 is provided with a radially outward enlargement 78 located at the collector's end portion adjacent the fuel pump as best revealed in FIGS. 2 and 7-10. The enlargement of the collector most importantly defines a radially or laterally extending surface means including connected surfaces 80, 82 and 84. A space adjacent the surfaces 80 and 82 define a space for one of the above identified projections from the fuel pump mount member 66. Thus, the surfaces lie adjacent the opening 86 for the fastener 68, shown in FIG. 2. The surface 84 is inclined with respect to the plane of the collector bottom 54 as best shown in FIG. 10. An aperture 88 extends therethrough and is close to the bottom surface 54 of the collector 52 and thus the fuel tank bottom so that fuel from the tank close to the bottom wall 10 may be drawn through the aperture 88 and into the collector 52.

As can be seen in FIGS. 6, 7, 9 and 10, the stiffener member 72 includes wall portions 90, 92 and 94 which conform to the collector's portions 80, 82 and 84 respectively. The plane of portions 90, 92 and 94 is thus lateral with respect to the axis of the elongated collector. Referring now to enlarged FIG. 12, the specific configuration of overlying portions 84 and 94 are best illustrated. The stiffener's wall portion 94 has an inwardly directed tubular extension or sleeve 96 extending through the aperture 88 and terminating slightly outward from the inner surface of the wall 84. The stiffener's wall 94 and its sleeve 96 thus defines a relatively rigid cylinder 98.

The sleeve 96 is adapted to receive a lower end portion of the fuel return conduit 40 as seen in FIGS. 1, 2 and 12. Specifically, the end portion of the fuel return defines a fuel return outlet 100 orientated to pass a stream of fuel into the interior of the collector 56. The end portion 100 includes an enlarged tubular portion or hood 102 having a slightly smaller outer diameter than the cylinder 98. Both the end portion 100 and hood 102 are curved about a center of rotation corresponding to the axis of fasteners 68. This allows the hood 102 to move through and within the cylinder 98 of sleeve 96 as the collector pivots from the installation position of FIG. 1 to the installed position of FIG. 2.

The end portion 100 and tubular hood 102 are integrally molded together. The hood 102 forms an inlet to the collector interior or fuel passage 104 as encircled by the sleeve 96. The tubular hood 102 is cut-away adjacent the end which forms the flow passage 100 in a manner defining inlet means 106. The inlet means 106 communicates with fuel in the surrounding tank and particularly fuel just above the tank bottom 10 as is shown on FIG. 12. Resultantly, return fuel from the engine compartment streams with significant velocity from the passage 100 and through the inlet 104. This fast flowing stream tends to drag additional fuel from the tank through the passage 104 and into the interior of the collector in the operative manner of an aspirator.

When fuel levels in the tank are at a low level, it is desirable to maintain a higher level of fuel in the collector to prevent starvation of the fuel pump. As a result of the afore described aspirator action, the fuel level in the collector 56 may be elevated above the fuel level in the surrounding tank. This occurs when the tank is near empty as is shown in FIG. 2 by numeral 108 which indicates a low fuel level. Also shown in FIG. 2, a relatively high fuel level in collector 52 is indicated by the numeral 110.

Figure 7:
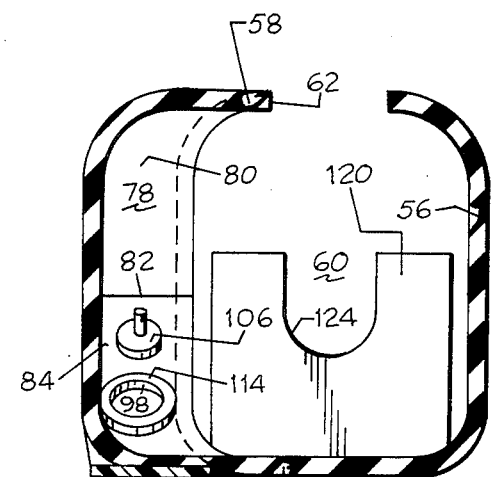
Figure 8:
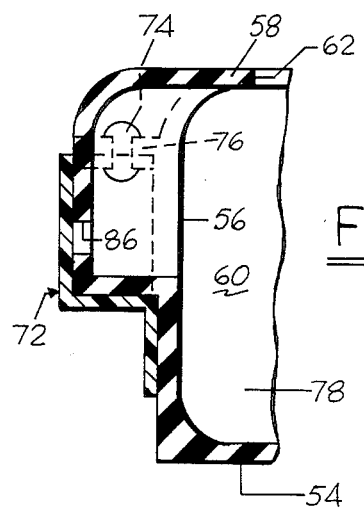
Figure 9:
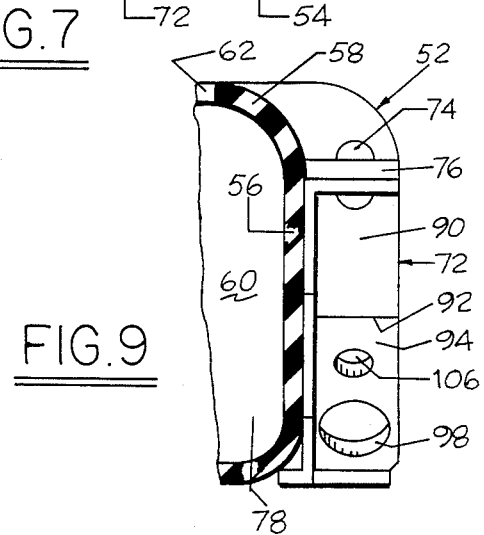

In addition to maintaining high fuel levels in the collector while the vehicle is operated, it is also desirable to maintain such an elevated level overnight or for longer periods. Thus, a capacity to maintain a high level overnight promotes starting the engine at a later time and before a significant fuel return flow is established to generate the above identified aspirator effect. For this purpose, an unidirectional flow device or check valve 112 is provided in overlying relation to the inner end surface 114 of the sleeve 96. It allows flow into the collector 56 but prevents flow out of the collector and back into the tank. The valve 112 is in the form of a flexible flap overlying the end portion 114. An upper portion of the check valve 112 is supportingly attached to a boss 116 formed by wall 94. Specifically, the valve 112 may be attached by a fastener or in the alternative by heat deforming a projecting portion of the boss as indicated by numeral 118. In FIGS. 7 and 10, the projecting portion 118 is shown before the valve 112 is applied thereabout and before the heat deformation.

During operation of the vehicle engine, the stream of return fuel discharged from the passage 100 and into passage 104 is sufficient to move the normally flat check valve 112 to the flow position in FIG. 12. When the engine is deactivated, the stream of fuel from passage 100 stops. Thereafter, the valve 112 moves to the position shown in FIG. 2 and fuel is resultantly prevented from flowing out of the collector 56. Also, when the collector 56 is in the installation position of FIG. 1, the flexible valve 112 moves in response to full insertion of end 102 of the return conduit 40 into the aperture 98.

Referring to FIGS. 4, 5, 7 and 11, the collector 56 includes a pair of upstanding supports 120 and 122 which are integrally molded with the collector body. These supports 120, 122 include aligned channels 124, 126 for the purpose of engaging a portion of the fuel outlet or conduit 32 when the collector is pivoted to the position of FIG. 1.

As seen in FIGS. 1-5, an integral portion of collector 56 projects therefrom to form a loop 128 on an end of the collector which is nearest cover member 20. The loop 128 defines an opening 130 for the purpose of attaching one end of a strap 132, shown in FIGS. 1-2. The other end of the strap is attached to a tab 134 extending from the cover member 20. For removal of the assembly from the fuel tank for service or the like, the strap is used to pivot the collector 56 from the installed position shown in FIG. 2 to the installation position illustrated in FIG. 1.

Although only a single embodiment of the fuel delivery device and collector has been illustrated and described in detail, it should be understood that modifications may be made which still fall within the following claims of the invention.

We claim:

1. In a vehicle with a fuel tank to store liquid fuel for combustion in an engine, the tank having an opening for receiving fuel handling apparatus including a fuel pump and two fuel conduits, one conduit supporting the fuel pump above a bottom wall of the fuel tank and receiving fuel from the pump, the other conduit returning excess fuel to the tank, an improved device to collect liquid fuel at a desirable level about the fuel pump, comprising: the collector including an elongated and thin walled enclosure with a top wall, a side wall and a bottom wall, the bottom wall adapted to rest upon the bottom of the fuel tank after installation in the fuel tank; the top wall of the enclosure having an opening therethrough for receiving the fuel pump and for escape of vapor from the enclosure so that liquid fuel flow between the tank and the enclosure is uninhibited; a mounting member having a central portion engaging the fuel pump and with projecting portions extending laterally therefrom within the collector interior, each projection contacting an opposite side wall on the interior of the collector; the fuel return conduit having an arm portion extending adjacent one side wall on the exterior of the collector; two fasteners, a first extending through the arm portion of the fuel return conduit and the collector's side wall into the mounting member, a second fastener extending through the opposite side wall into the mounting member, the fasteners having a common axis extending laterally and substantially normal to the axis of the elongated collector, whereby the collector is allowed to pivot about the common fastener axis between an installation position in with the elongated collector is closely spaced with respect to the conduits thereby minimizing the cross-sectional shape for easy insertion through the opening in the fuel tank and an installed position in with the collector pivots away from the conduits so that its bottom wall lies adjacent the fuel tank's bottom wall.

2. In a vehicle, a fuel tank having an opening therethrough, fuel handling apparatus including a fuel pump and an associated fuel collector, both insertably installed within the fuel tank interior through the opening, the collector accumulating liquid fuel about the fuel pump even when the fuel tank is near empty and the liquid fuel level therein is close to the tank bottom, the fuel handling apparatus including a return fuel conduit which directs a stream of fuel into the collector's interior, comprising: the collector including an elongated and thin walled enclosure having a top wall, side walls and a bottom wall, the top wall defining an opening for entry of the fuel pump into the enclosure and for the escape of vapor from the collector so that liquid flow into the collector is uninhibited; means about the fuel pump for mounting the collector about the pump including a pair of projections extending laterally in the enclosure and in opposite directions so that each projection contacts a side wall of the enclosure; the fuel return conduit having an offset arm portion which extends over and along the outside of a side wall laterally outward from one of the projections; fastener means extending through the arm portion and the side wall to attach the fuel return conduit, side wall and mount means together; another fastener means extending through the opposite side wall to attach the side wall and mount means together, the two fastener means sharing a common axis which is substantially normal to the longitudinal extent of the elongated enclosure whereby the collector may pivot from an installation position in with the enclosure is closely spaced with respect to the conduits thereby defining a relatively small cross-sectional shape easily inserted through the fuel tank opening and to an installed position in with the enclosure is moved away from the conduits into engagement with the bottom of the fuel tank.

3. The fuel handling apparatus set forth in claims 1 or 2 in which the fuel pump mounting member is molded of relatively rigid material and has a central portion encircling at least an end of the fuel pump and the projections take the form of tubular portions, the interior of which treadably receive the fasteners.

4. The fuel handling apparatus set forth in claims 1 or 2 and an attachment means formed on the end portion of the enclosure remote from the opposite end portion adjacent the fuel pump and resultantly located near the fuel tank opening; a strap attached to the attachment means which is accessible through the fuel tank opening to manually pivot the enclosure from the installed position to the installation position so that the apparatus may be removed from the fuel tank through the opening.

* * * * *